United States Patent
Chang (10) Patent No.: US 10,380,950 B2
(45) Date of Patent: Aug. 13, 2019

(54) METHOD FOR REDUCING MOTION BLUR AND HEAD MOUNTED DISPLAY APPARATUS

(71) Applicant: NOVATEK MICROELECTRONICS CORP., HsinChu (TW)

(72) Inventor: Kuei-Chung Chang, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 131 days.

(21) Appl. No.: 15/273,878

(22) Filed: Sep. 23, 2016

(65) Prior Publication Data

US 2018/0090078 A1   Mar. 29, 2018

(51) Int. Cl.
  *G09G 3/34* (2006.01)
  *G06F 3/01* (2006.01)
  *G09G 3/00* (2006.01)

(52) U.S. Cl.
  CPC .......... *G09G 3/3406* (2013.01); *G06F 3/013* (2013.01); *G09G 3/003* (2013.01); *G09G 2310/08* (2013.01); *G09G 2320/0626* (2013.01); *G09G 2330/026* (2013.01)

(58) Field of Classification Search
  CPC ........ G06F 3/017; G06F 3/011; G06F 3/0346; G06F 3/04815; G06F 3/03547; G06F 3/038; G06F 3/0482; G06F 3/04842; G06F 3/04855; G06F 3/04883
  See application file for complete search history.

(56) References Cited

U.S. PATENT DOCUMENTS

| | | | |
|---|---|---|---|
| 9,207,455 B2 | 12/2015 | Bickerstaff et al. | |
| 2011/0116547 A1* | 5/2011 | Chen | G06T 3/40 375/240.16 |
| 2011/0261050 A1* | 10/2011 | Smolic | G06T 15/20 345/419 |
| 2014/0267420 A1* | 9/2014 | Schowengerdt | G06F 3/012 345/633 |
| 2015/0002624 A1* | 1/2015 | Terai | H04N 13/139 348/42 |
| 2017/0018056 A1* | 1/2017 | Holzer | G06K 9/6201 |
| 2017/0340969 A1* | 11/2017 | Lim | G02B 27/0172 |

\* cited by examiner

*Primary Examiner* — Md Saiful A Siddiqui (74) *Attorney, Agent, or Firm* — McClure, Qualey & Rodack, LLP (57) ABSTRACT

A method for reducing motion blur in a video signal of a head mounted display apparatus is provided. The method includes the following steps. Receive the video signal including a first frame and a second frame. Track an eye movement of a user to determine a user view area. Generate an intermediate frame between the first frame and the second frame. Provide the first frame, the intermediate frame, and the second frame for display. The step of generating the intermediate frame includes synthesizing pixel values only in the user view area of the intermediate frame.

9 Claims, 6 Drawing Sheets

METHOD FOR REDUCING MOTION BLUR AND HEAD MOUNTED DISPLAY APPARATUS

TECHNICAL FIELD

The disclosure relates in general to displaying video signal, and more particularly to a head mounted display apparatus and a method for reducing motion blur applied thereto.

BACKGROUND

As the demand for virtual reality (VR) application grows, head mounted displays have become more and more popular recently. A head mounted display (HMD) is a display device worn on the head. The HMD has a small display panel in front of one eye or both eyes. Liquid crystal display (LCD) is a common display technology used in HMD display panels. Because LCD is "hold-type" displays (in contrast to "impulse-type" displays such as cathode ray tube, CRT), LCD panel often suffers from motion blur problem. The motion blur problem in the HMD appears more severe because (a) the HMD panel is very close to a user's eyes and (b) the videos displayed in VR applications are based on the user's head movement, which may be very frequent. Therefore, it is an important subject in the industry to design a method for reducing motion blur in the HMD.

SUMMARY

The disclosure is directed to a method for reducing motion blur and a head mounted display apparatus.

According to one embodiment of the invention, a method for reducing motion blur in a video signal of a head mounted display apparatus is provided. The method includes the following steps. Receive the video signal including a first frame and a second frame. Track an eye movement of a user to determine a user view area. Generate an intermediate frame between the first frame and the second frame. Provide the first frame, the intermediate frame, and the second frame for display. The step of generating the intermediate frame includes synthesizing pixel values only in the user view area of the intermediate frame.

According to one embodiment of the invention, a head mounted display apparatus is provided. The head mounted display apparatus includes a graphics processing unit, an eye tracking device, a display driver, and a display panel. The graphics processing unit is configured to provide a video signal including a first frame and a second frame. The eye tracking device is configured to track an eye movement of a user to determine a user view area. The display driver is configured to synthesize pixel values only in the user view area of an intermediate frame, wherein the intermediate frame is inserted between the first frame and the second frame. The display panel is driven by the display driver to display the first frame, the intermediate frame, and the second frame.

According to one embodiment of the invention, a method for reducing motion blur in a video signal of a head mounted display apparatus is provided. The method includes the following steps. Receive the video signal. Track an eye movement of a user to determine a user view area. Adjust a power-on timing of the backlight module based on the user view area for displaying the video signal on a display panel.

According to one embodiment of the invention, a head mounted display apparatus is provided. The head mounted display apparatus includes a display panel, an eye tracking device, and a backlight module. The eye tracking device is configured to track an eye movement of a user to determine a user view area. The backlight module is turned on and off periodically to illuminate the display panel, wherein a power-on timing is adjusted based on the user view area determined by the eye tracking device.

The invention will become apparent from the following detailed description of the preferred but non-limiting embodiments. The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Digital video and modern display technologies introduce several factors that contribute to motion blur, such as pixel response time on LCD displays, and blur from eye tracking fast-moving objects on hold-type LCD. Motion blur has been a severe problem for LCD displays due to their sample-and-hold nature. Motion blur caused by sample-and-hold may be reduced by shortening the amount of time a frame is displayed for. One possible approach is to increase the display frame rate (or update date, refresh rate), such as increasing the update rate from 60 Hz to 120 Hz. Another possible approach is to reduce the time an LCD pixel is lit, which may be accomplished via turning off the backlight for part of a refresh or decreasing the time the backlight is on (strobed backlight, scanning backlight, backlight blinking, black frame insertion).

For the first approach (increasing update rate), frame interpolation may be used to generate artificial in-between frames that are inserted between the real frames. Frame interpolation may be accomplished by motion interpolation, which may include motion estimation and motion compensation performed on two image frames. Motion interpolation attempts to make video more fluid to reduce motion blur. In a HMD, because there is embedded lens to magnify pixels on the display, the resolution requirement for a HMD is high in order to produce clear images. High update rate and high image resolution increase the required processing power of a graphics processing unit (GPU) as well as bandwidth between the GPU and the display panel. For example, a display with 4K resolution (3840×2160) requires 4 times processing power and bandwidth to a display with FHD resolution (1920×1080). Also, a display with 120 Hz update rate requires 2 times processing power to a display with 60 Hz update rate. As described above, a large amount of hardware resource may be needed for high update rate and high resolution. To reduce the required hardware resource, a head mounted display apparatus and a method for reducing motion blur applied thereto are provided.

Figure 1:
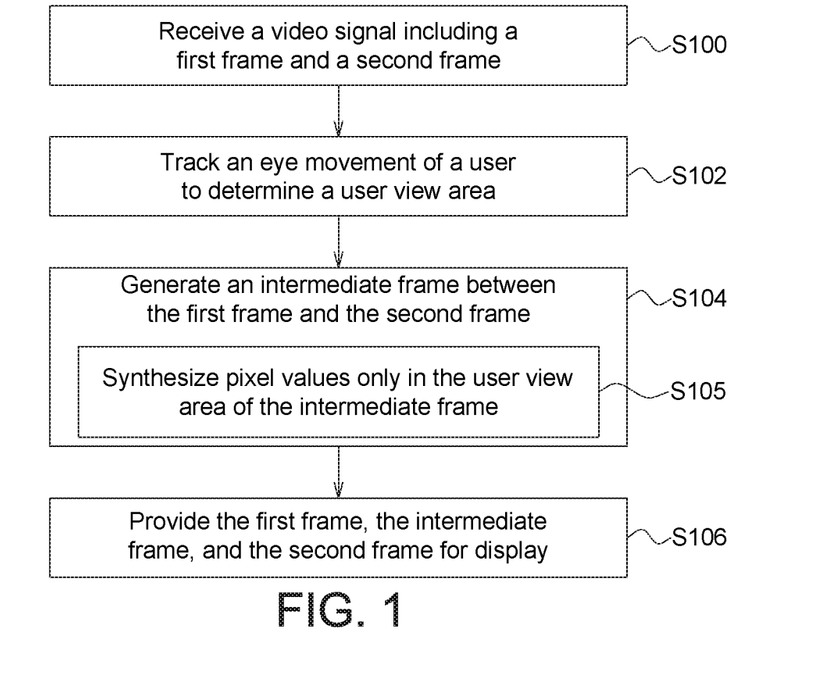
FIG. 1 shows a flowchart of the method for reducing motion blur in a video signal according to one embodiment of the invention.

FIG. 1 shows a flowchart of the method for reducing motion blur in a video signal according to one embodiment of the invention. The method includes the following steps. Step S100: Receive a video signal including a first frame and a second frame. Step S102: Track an eye movement of a user to determine a user view area. Step S104: Generate an intermediate frame between the first frame and the second frame. Step S106: Provide the first frame, the intermediate frame, and the second frame for display. The step S104 of generating the intermediate frame includes a step S105: Synthesize pixel values only in the user view area of the intermediate frame.

Figure 2:
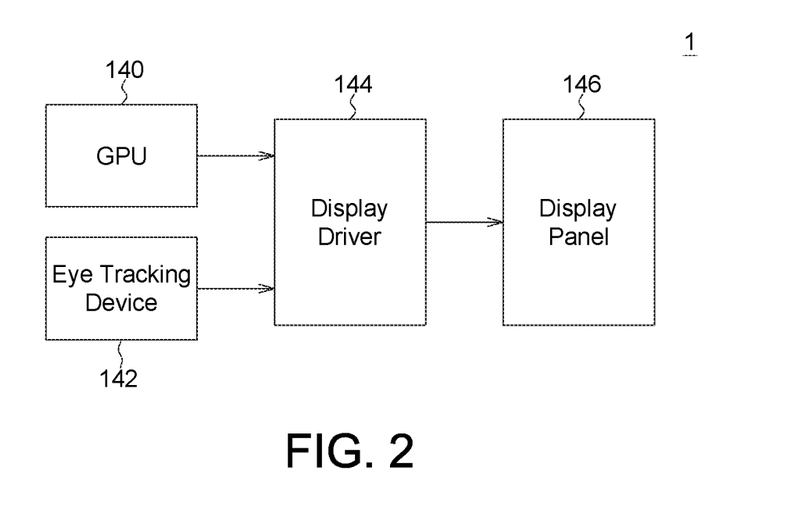
FIG. 2 shows a diagram illustrating a head mounted display apparatus according to one embodiment of the invention.

FIG. 2 shows a diagram illustrating a head mounted display apparatus according to one embodiment of the invention. The head mounted display apparatus 1 includes a graphics processing unit (GPU) 140, an eye tracking device 142, a display driver 144, and a display panel 146. The graphics processing unit 140 is configured to provide a video signal including a first frame f1 and a second frame f2. The eye tracking device 142 is configured to track an eye movement of a user to determine a user view area VA. The display driver 144 is configured to synthesize pixel values only in the user view area VA of an intermediate frame fi, wherein the intermediate frame fi is inserted between the first frame f1 and the second frame f2. The display panel 146 is driven by the display driver 144 to display the first frame f1, the intermediate frame fi, and the second frame f2.

Step S100 may be performed by the display driver 144. The GPU 140 provides the video signal to the display driver 144, where the video signal includes a first frame f1 and a second frame f2. For example, the video signal may include multiple temporally spaced image frames including consecutive the first frame f1 and the second frame f2. Step S102 may be performed by the eye tracking device 142. The eye tracking device 142 may measure the point of gaze to sense where the user is looking. The eye tracking device 142 may be implemented in several ways, including measuring the movement of an object (normally, a special contact lens) attached to the eye, optical tracking without direct contact to the eye (video based method), and measuring electric potentials using electrodes placed around the eyes. The actual implementation of the eye tracking device 142 is not limited thereto. The eye tracking device 142 tracks eye movement to determine a user view area VA where the user is looking.

After the user view area VA is extracted, the display driver 144 may perform step S105 to synthesize pixel values in the user view area VA of the intermediate frame fi using frame interpolation. The frame interpolation may be accomplished by motion estimation (ME) and motion compensation (MC) performed on the first frame f1 and the second frame f2. For example, after calculating the motion vectors regarding the first frame f1 and the second frame f2, the intermediate frame may be obtained by applying half amplitude of the motion vectors. ME and MC requires large computation power. In this embodiment, because only a part of the image (the user view area VA) needs to be interpolated, the required processing power is greatly reduced.

Since the user is currently looking at the user view area VA, motion blur happens outside the user view area VA may be ignored, and thus only the user view area VA needs the frame interpolation related process. Such reduction in computation tasks can save hardware cost of the display driver 144 and also increase the processing speed. In one embodiment, an initial user view area obtained from the eye tracking device 142 may be enlarged to generate the user view area VA in the display driver 144 for a safer guard band to guarantee the motion blur effect in the user's field of view is minimized.

After the frame interpolation performed on the user view area VA, the display driver 144 may provide the first frame f1, the intermediate frame fi, and the second frame f2 to the display panel 146 for display (step S106). The display panel 146 may be a LCD panel or an organic light emitting diode (OLED) display panel. That is, the method for reducing motion blur involving frame interpolation can be applied to both LCD and OLED display panels.

Figure 3:
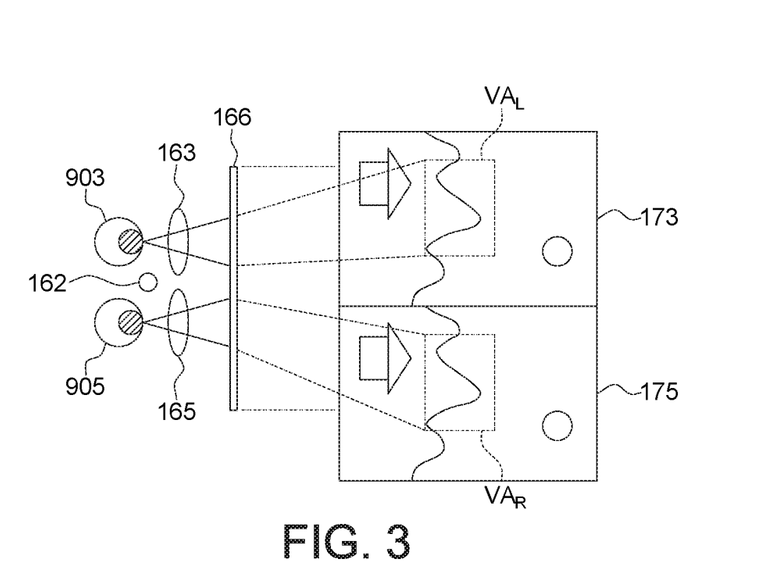
FIG. 3 shows a diagram illustrating user's eyes and a head mounted display having an eye tracking device.

To clearly illustrate an example of the method shown in FIG. 1 and the HMD shown in FIG. 2, FIG. 3 shows a diagram illustrating user's eyes and a head mounted display having an eye tracking device. In the example shown in FIG. 3, there are lens 163 and lens 165 in front of the display panel 166 of the HMD. An eye tracking device 162 is disposed near a user's eyes 903 and 905. In this embodiment, the display panel 166 shows a left eye image 173 for the user's left eye 903 and a right eye image 175 for the user's right eye 905. The eye tracking device 162 tracks user's eye movement to obtain a user view area VA, which includes a left eye view area $VA_L$ and a right eye view area $VA_R$ in this example. The display driver (not shown in this figure) may synthesize pixel values only in both the left eye view area $VA_L$ and the right eye view area $VA_R$. That is, motion interpolation including ME and MC is performed on the left eye image 173 and the right eye image 175 separately. In another embodiment, the display panel 166 may include two separate panels for the two eyes.

As for the pixel values other than the view area VA in the intermediate frame fi, these pixel values may be duplicated either from the first frame f1 (forward duplication) or from the second frame f2 (backward duplication). Directly duplicating pixel values prevents extra computation cost for generating the intermediate frame fi. Regarding the step S104 of generating the intermediate frame fi, in one embodiment, pixel values of the intermediate frame fi are the same as pixel values of the first frame f1 except in the user view area VA. In another embodiment, pixel values of the intermediate frame fi are the same as pixel values of the second frame f2 except in the user view area VA.

Figure 4:
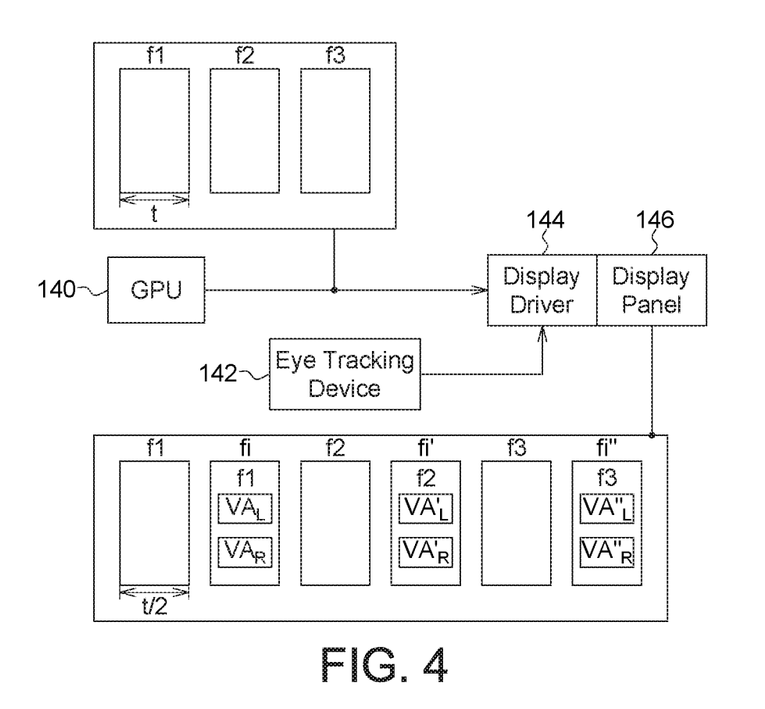
FIG. 4 shows a diagram illustrating an example image data flow in a head mounted display according to one embodiment of the invention.

The pixel duplication task (duplicate frame insertion) may be performed either by the display driver 144 or by the GPU 140. FIG. 4 shows a diagram illustrating an example image data flow in a head mounted display according to one embodiment of the invention. The GPU 140 provides the video signal including frames f1, f2, f3 to the display driver 144. After the display driver 144 obtains the user view area VA (including the left eye view are $VA_L$ and right eye view area $VA_R$ in this example) from the eye tracking device 142, the display driver 144 synthesize pixel values in the user view area VA and duplicate pixel values that are not in the user view area VA. In this example, the display driver 144 duplicates from the frame previous to the intermediate frame (for the intermediate frame fi, the pixel values other than the user view area VA are copied from the first frame f1).

Figure 5:
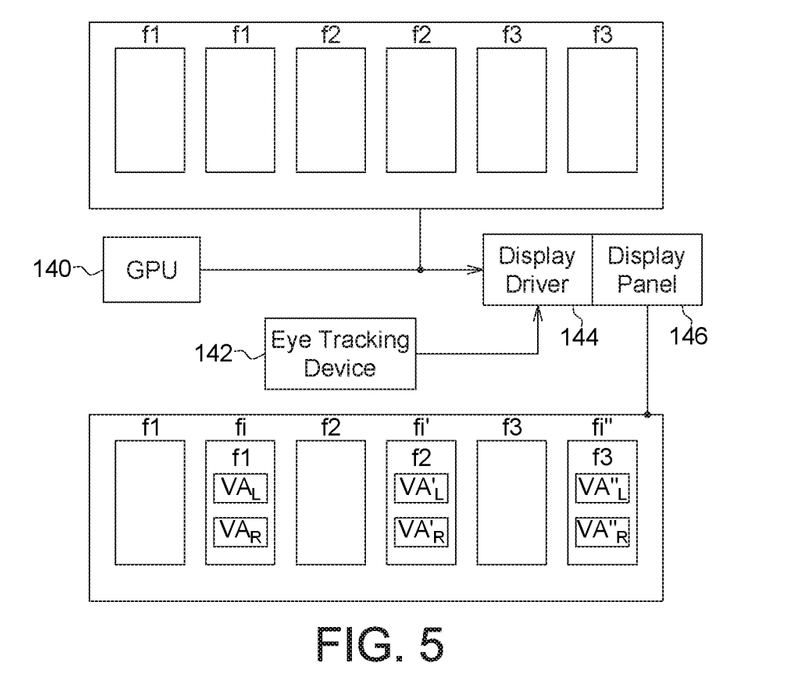
FIG. 5 shows a diagram illustrating an example image data flow in a head mounted display according to one embodiment of the invention.

FIG. 5 shows a diagram illustrating an example image data flow in a head mounted display according to one embodiment of the invention. In this example the GPU 140 performs the duplicate frame insertion task. That is, the video signal provided to the display driver 144 has already been inserted intermediate frames (forward duplication in this example). After the display driver 144 obtains the user view area VA, the display driver 144 is configured to modify pixel values in the user view area VA of the intermediate frame fi using frame interpolation. Although forward duplication is shown in FIG. 4 and FIG. 5 as examples, backward duplication (for the intermediate frame fi, the pixel values are copied from the second frame f2) is also applicable in implementation. As the example shown in FIG. 5, the step S104 of generating the intermediate frame fi may be performed by the display driver 144 in combination with the GPU 140. The embodiment shown in FIG. 5 requires higher bandwidth between the GPU 140 and the display driver 144 as compared to the embodiment shown in FIG. 4 (the number of frames transmitted between the GPU 140 and the display driver 144 is doubled).

For the second approach to reduce motion blur (backlight blinking), the backlight module for the display panel may be turned on and off periodically to illuminate the LCD from the back of the display panel. The light source of the backlight module may be light-emitting diode (LED) or cold cathode fluorescent lamps (CCFL). In the backlight blinking approach, the backlight module is cycling on and off faster than the human eye can perceive.

Figure 7A:
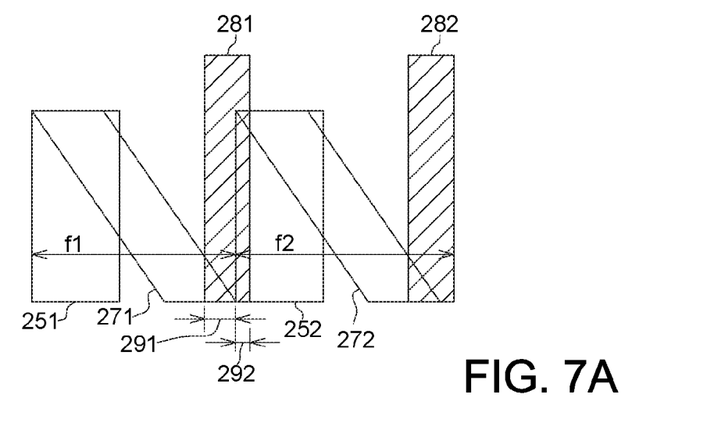
FIG. 7A and FIG. 7B show diagrams illustrating an example ghost image in a LCD panel.
Figure 7B:
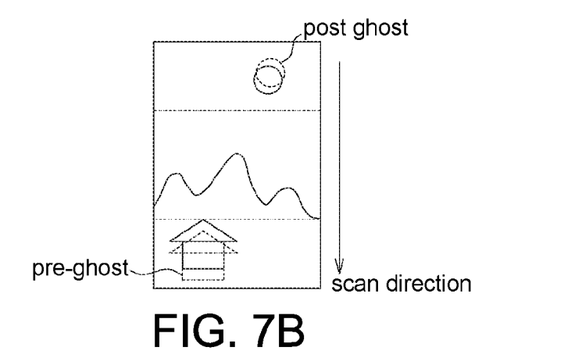

FIG. 7A and FIG. 7B show diagrams illustrating an example ghost image in a LCD panel. For displaying an image on a LCD, the pixels are scanned from top to bottom as shown in FIG. 7B. The liquid crystal needs certain response time to display the correct image contents. In FIG. 7A, the period 251 and period 252 are panel refresh times. The parallelogram 271 represents the liquid crystal response time for displaying the first frame f1. Similarly, the parallelogram 272 represents the liquid crystal response time for displaying the second frame f2. The shaded blocks 281 and 282 represent the periods when the backlight module is turned on. As can be seen in FIG. 7A, in the time period 291, the liquid crystals corresponding to pixels near the bottom edge of the display panel have not been ready for displaying the correct first frame f1. These pixels are still showing contents in the previous frame, causing a pre-ghost image near the bottom edge of the display panel. On the other hand, in the time period 292, the liquid crystals corresponding to pixels near the top edge of the display panel start to twist according to the second frame f2. These pixels are now showing contents in the next frame, causing a post-ghost image near the top edge of the display panel.

Figure 8:
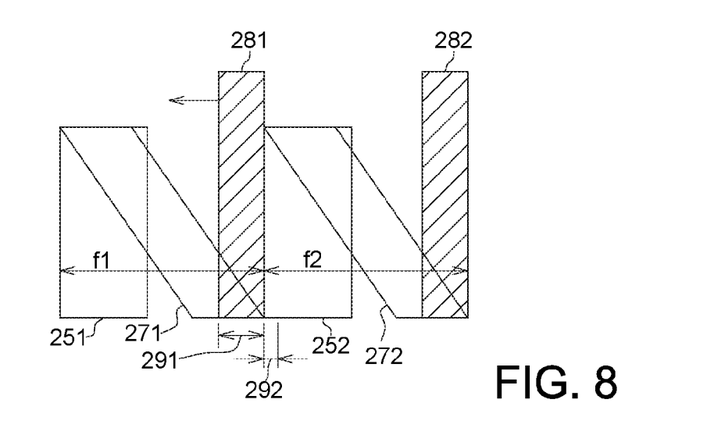
FIG. 8 shows a diagram illustrating an example of shifting the power-on timing of the backlight module earlier.

FIG. 8 shows a diagram illustrating an example of shifting the power-on timing of the backlight module earlier. As compared to the example shown in FIG. 7, the power-on timing of the backlight module is shifted earlier (refer to the left shifted block 281). In this scenario, the period 291 is increased, resulting in an increased range of the pre-ghost image. However, the period 292 is decreased or even removed, thus reducing or even eliminating the post-ghost image.

Figure 9:
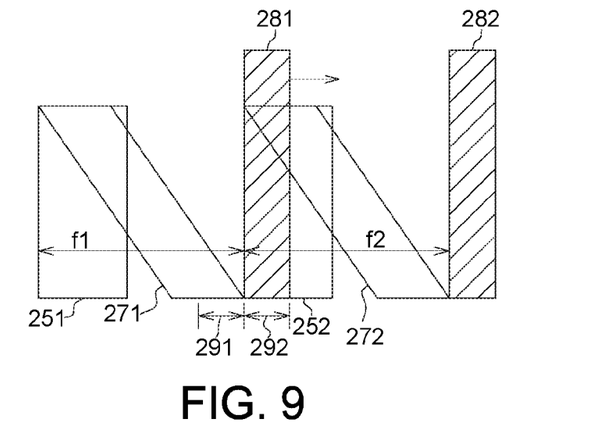
FIG. 9 shows a diagram illustrating an example of shifting the power-on timing of the backlight module later.

FIG. 9 shows a diagram illustrating an example of shifting the power-on timing of the backlight module later. As compared to the example shown in FIG. 7, the power-on timing of the backlight module is shifted later (refer to the right shifted block 281). In this scenario, the period 292 is increased, resulting in an increased range of the post-ghost image. However, the period 291 is decreased or even removed, thus reducing or even eliminating the pre-ghost image.

Figure 6:
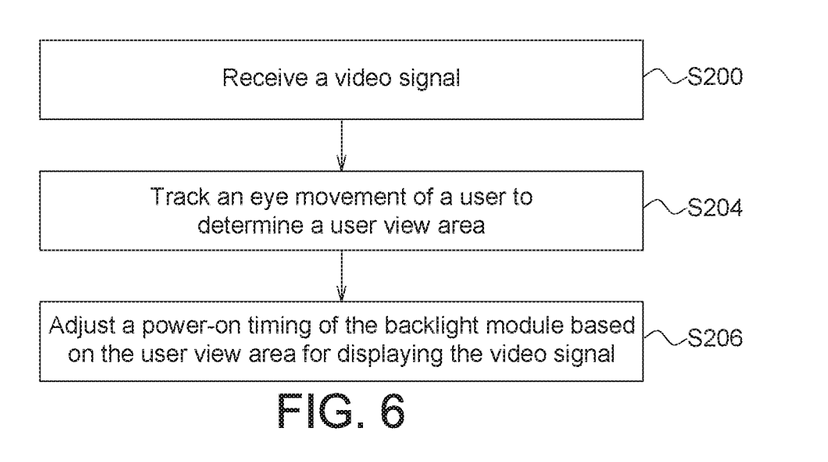
FIG. 6 shows a flowchart of the method for reducing motion blur in a video signal according to one embodiment of the invention.

Based on the effect shown in FIG. 8 and FIG. 9, a method for reducing motion blur by adjusting the power-on timing of the backlight module is provided. FIG. 6 shows a flowchart of the method for reducing motion blur in a video signal of a head mounted display apparatus according to one embodiment of the invention. The method includes the following steps. Step S200: Receive the video signal. Step S204: Track an eye movement of a user to determine a user view area. Step S206: Adjust a power-on timing of the backlight module based on the user view area for displaying the video signal on a display panel.

Figure 10:
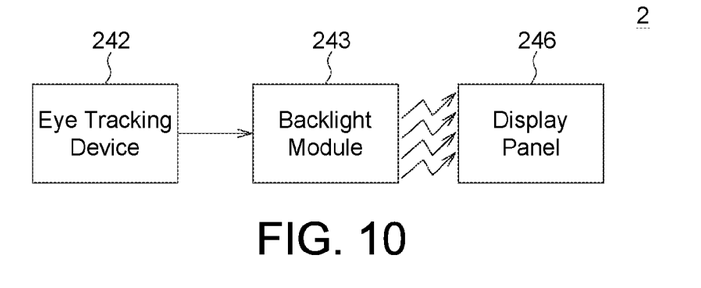
FIG. 10 shows a diagram illustrating a head mounted display apparatus according to one embodiment of the invention.

FIG. 10 shows a diagram illustrating a head mounted display apparatus according to one embodiment of the invention. The head mounted display apparatus 2 includes a display panel 246, an eye tracking device 242, and a backlight module 243. The eye tracking device 242 is configured to track an eye movement of a user to determine a user view area VA. The backlight module 243 is turned on and off periodically to illuminate the display panel 246, wherein a power-on timing is adjusted based on the user view area VA determined by the eye tracking device 242. The display panel 246 may be a LCD panel for displaying video signal.

The step S200 may be performed by the display panel 246, which may be a LCD panel. The step S202 may be performed by the backlight module 243, which may include light sources and control circuits for controlling the power-on and power-off timing. The step S204 may be performed by the eye tracking device 242. The step S206 of adjusting the power-on timing may be performed by the backlight module 243. As the examples shown in FIG. 8 and FIG. 9, by advancing or delaying the power-on timing of the backlight module 243, the location of the ghost image can be controlled effectively. Therefore, after obtaining the user view area VA, the power-on timing of the backlight module 243 can be controlled accordingly such that the ghost image does not appear in the user view area VA.

For example, if the user view area VA is closer to a top edge of the display panel 246 than to a bottom edge of the display panel 246, the post-ghost image near the top edge should be avoided, and thus the backlight module 243 is configured to shift the power-on timing earlier. On the other hand, if the user view area VA is closer to the bottom edge of the display panel 246 than to the top edge of the display panel 246, the pre-ghost image near the bottom edge should be avoided, and thus the backlight module 243 is configured to shift the power-on timing later.

As the embodiments shown above, by dynamically adjusting the power-on timing of the backlight module based on the user view area VA, the motion blur effect can be reduced effectively. Such adjustment may be performed every time the backlight is turned on. By tracking the eye movement of the user continuously, the power-on timing can be adjusted according to the latest acquired user view area VA.

Figure 11:
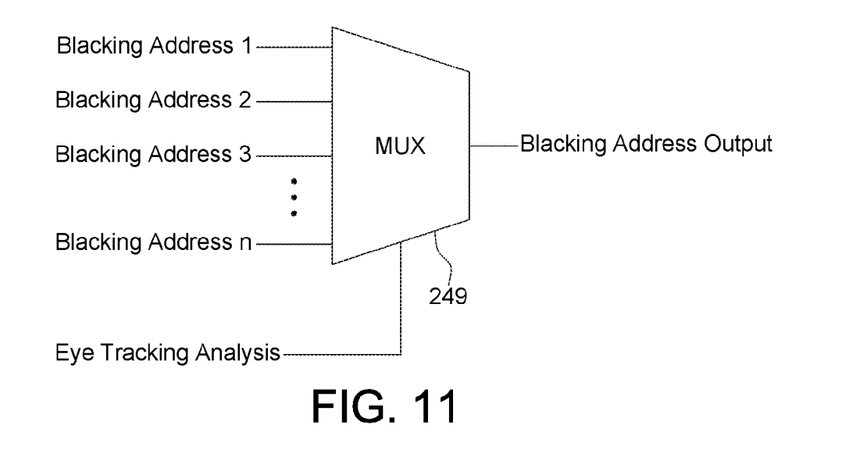
FIG. 11 shows a diagram illustrating an example implementation of backlight timing control.

There may be several possible implementations for the control circuit in the backlight module to control the power-on timing. For example, the control circuit may compute the power-on timing according to a predetermined formula which takes the user view area VA as a parameter. Alternatively, the control circuit may store a predetermined lookup table which records the relationship between the user view area and the power-on timing. FIG. 11 shows a diagram illustrating an example implementation of backlight timing control. In this embodiment, the control circuit includes a multiplexer (MUX) 249. The MUX 249 is configured to select among multiple blacking addresses (corresponding to different power-on timings of the backlight module 243) in response to the eye tracking analysis result (obtained from the eye tracking device 242).

Figure 12:
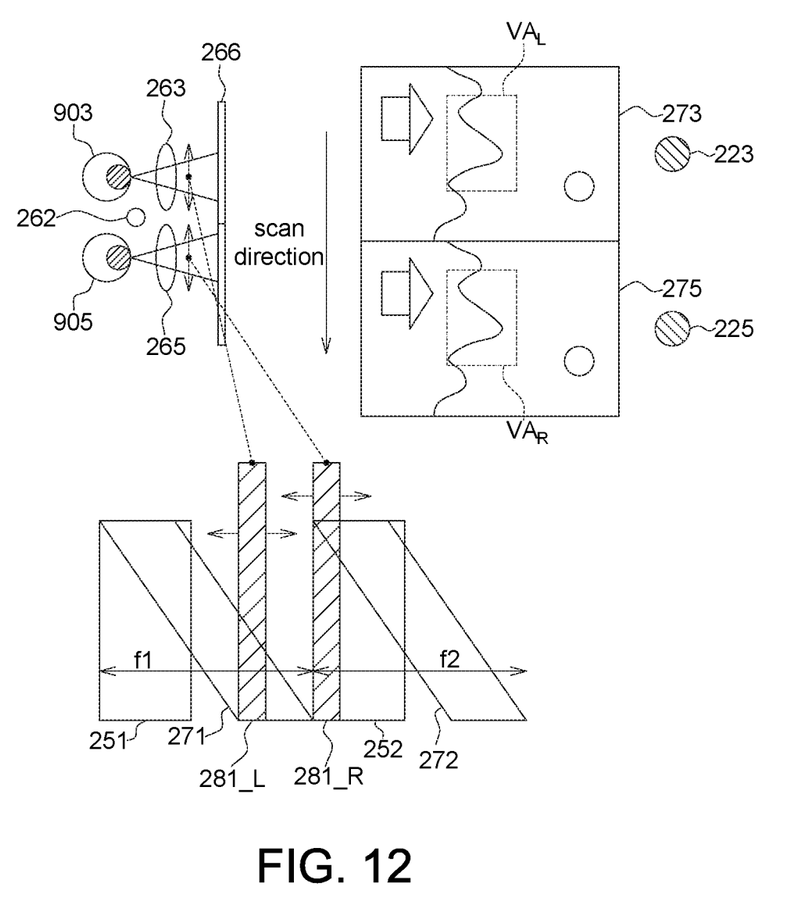
FIG. 12 shows a diagram illustrating a head mounted display apparatus including two separate backlight units for two eyes.

FIG. 12 shows a diagram illustrating a head mounted display apparatus including two separate backlight units for two eyes. In the example shown in FIG. 12, there are lens 263 and lens 265 in front of the display panel 266 of the HMD. An eye tracking device 262 is disposed near a user's eyes 903 and 905. In this embodiment, the display panel 266 shows a left eye image 273 for the user's left eye 903 and a right eye image 275 for the user's right eye 905. The eye tracking device 262 tracks user's eye movement to obtain a user view area VA, which includes a left eye view area $VA_L$ and a right eye view area $VA_R$. Backlights for the left eye image 273 and the right eye image 275 are controlled separately. The backlight module includes a left eye backlight module 223 and a right eye backlight module 225. The left eye backlight module 223 is configured to adjust a power-on timing of the left eye backlight module 223 (shaded block 281_L) based on the left eye view area $VA_L$, and the right eye backlight module 225 is configured to adjust a power-on timing of the right backlight module 225 (shaded block 281_R) based on the right eye view area $VA_R$.

For reducing the motion blur in a head mounted display apparatus, a method for increasing update rate is provided, which may be implemented in the display driver. Another method for adjusting backlight timing is also provided, which may be implemented in the backlight module. By adopting the proposed method and the head mounted display apparatus, the motion blur problem in the user view area where the user is currently looking can be prevented. There may still be motion blur occurring outside the user view area, but such blur would not be noticed by the user since it is not within the current view area. By focusing on reducing the blur effect within the user view area, the hardware cost can be saved and the processing speed can be enhanced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for reducing motion blur in a video signal of a head mounted display apparatus, the method comprising:
    receiving the video signal comprising a first frame and a second frame by a display driver;
    tracking an eye movement of a user to determine a user view area, wherein the user view area is less than a complete frame;
    generating an intermediate frame between the first frame and the second frame; and
    providing the first frame, the intermediate frame, and the second frame for display;
    wherein the step of generating the intermediate frame comprises synthesizing pixel values only in the user view area of the intermediate frame based on the eye movement of the user and performing motion estimation and motion compensation only in the user view area of the intermediate frame based on the eye movement of the user.

2. The method according to claim 1, wherein pixel values of the intermediate frame are the same as pixel values of the first frame except in the user view area.

3. The method according to claim 1, wherein pixel values of the intermediate frame are the same as pixel values of the second frame except in the user view area.

4. The method according to claim 1, wherein the user view area comprises a left eye view area and a right eye view area.

5. A head mounted display apparatus, comprising:
    a display driver receiving a video signal comprising a first frame and a second frame;
    an eye tracking device, configured to track an eye movement of a user to determine a user view area, wherein the user view area is less than a complete frame;
    wherein the display driver is further configured to synthesize pixel values only in the user view area of an intermediate frame based on the eye movement of the user and perform motion estimation and motion compensation only in the user view area of the intermediate frame based on the eye movement of the user, wherein the intermediate frame is inserted between the first frame and the second frame; and
    a display panel, driven by the display driver to display the first frame, the intermediate frame, and the second frame.

6. The head mounted display apparatus according to claim 5, wherein the display driver is configured to duplicate pixel values of the first frame except in the user view area to generate the intermediate frame.

7. The head mounted display apparatus according to claim 5, wherein the display driver is configured to duplicate pixel values of the second frame except in the user view area to generate the intermediate frame.

8. The head mounted display apparatus according to claim 5, wherein the display driver is configured to modify pixel values in the user view area of the intermediate frame using frame interpolation.

9. The head mounted display apparatus according to claim 5, wherein the user view area comprises a left eye view area and a right eye view area.

* * * * *